(12) United States Patent
Itoh

(10) Patent No.: US 8,452,168 B2
(45) Date of Patent: May 28, 2013

(54) DISTANCE MEASUREMENT AND PHOTOMETRY DEVICE, DISTANCE MEASUREMENT AND PHOTOMETRY METHOD, AND IMAGING APPARATUS

(75) Inventor: Kei Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 38 days.

(21) Appl. No.: 13/193,720

(22) Filed: Jul. 29, 2011

(65) Prior Publication Data
US 2012/0033957 A1 Feb. 9, 2012

(30) Foreign Application Priority Data

Aug. 5, 2010 (JP) ................................. 2010-175870
Apr. 25, 2011 (JP) ................................. 2011-096919

(51) Int. Cl.
*G02B 7/28* (2006.01)
(52) U.S. Cl.
USPC ........................................................ 396/111
(58) Field of Classification Search
USPC ........................................................ 396/111
See application file for complete search history.

(56) References Cited

U.S. PATENT DOCUMENTS

| | | | | |
|---|---|---|---|---|
| 5,302,997 A * | 4/1994 | Cocca | ............................... | 396/99 |
| 7,020,391 B2 * | 3/2006 | Ohkado | ........................ | 396/111 |
| 7,626,616 B2 * | 12/2009 | Kokubo et al. | ............. | 348/229.1 |
| 8,107,002 B2 * | 1/2012 | Kato | .............................. | 348/362 |
| 2003/0147638 A1 * | 8/2003 | Takasaki et al. | ............... | 396/111 |
| 2004/0047621 A1 * | 3/2004 | Shimizu et al. | ................ | 396/100 |
| 2004/0071457 A1 * | 4/2004 | Nonaka et al. | ................... | 396/89 |
| 2005/0008355 A1 * | 1/2005 | Sato et al. | ........................ | 396/54 |
| 2009/0015707 A1 * | 1/2009 | Hibino et al. | .................. | 348/347 |
| 2009/0147122 A1 * | 6/2009 | Kato | ......................... | 348/333.01 |
| 2011/0188843 A1 * | 8/2011 | Oouchida | ..................... | 396/111 |

FOREIGN PATENT DOCUMENTS

| | | |
|---|---|---|
| JP | 2004-226678 | 8/2004 |
| JP | 2005-227750 | 8/2005 |

* cited by examiner

*Primary Examiner* — Rodney Fuller
(74) *Attorney, Agent, or Firm* — Oblon, Spivak, McClelland, Maier & Neustadt, L.L.P.

(57) ABSTRACT

A distance measurement and photometry device includes a pair of distance measurement sensors each of which is a two-dimensional image sensor, a photometry sensor, which includes a two-dimensional image sensor, a pair of distance measurement lenses arranged to correspond to the pair of distance measurement sensors, a photometry lens arranged to correspond to the photometry sensor, a photometry process unit that calculates a brightness value of a subject, an exposure state setting unit that sets an exposure state correspond to at least the pair of distance measurement sensors, a distance measurement unit that measures a distance to the subject, wherein the exposure state setting unit alternates an exposure state of at least the pair of distance measurement sensors corresponding to a result of the photometry process unit.

9 Claims, 12 Drawing Sheets

FIG. 8

13c (CCD1013)

| Y1 | Y2 | Y3 | Y4 | Y5 | Y6 | Y7 | Y8 | Y9 | Y10 | Y11 | Y12 | Y13 | Y14 | Y15 | Y16 |
|---|---|---|---|---|---|---|---|---|---|---|---|---|---|---|---|
| Y17 | Y18 | Y19 | Y20 | Y21 | Y22 | Y23 | Y24 | Y25 | Y26 | Y27 | Y28 | Y29 | Y30 | Y31 | Y32 |
| Y33 | Y34 | Y35 | Y36 | Y37 | Y38 | Y39 | Y40 | Y41 | Y42 | Y43 | Y44 | Y45 | Y46 | Y47 | Y48 |
| Y49 | Y50 | Y51 | Y52 | Y53 | Y54 | Y55 | Y56 | Y57 | Y58 | Y59 | Y60 | Y61 | Y62 | Y63 | Y64 |
| Y65 | Y66 | Y67 | Y68 | Y69 | Y70 | Y71 | Y72 | Y73 | Y74 | Y75 | Y76 | Y77 | Y78 | Y79 | Y80 |
| Y81 | Y82 | Y83 | Y84 | Y85 | Y86 | Y87 | Y88 | Y89 | Y90 | Y91 | Y92 | Y93 | Y94 | Y95 | Y96 |
| Y97 | Y98 | Y99 | Y100 | Y101 | Y102 | Y103 | Y104 | Y105 | Y106 | Y107 | Y108 | Y109 | Y110 | Y111 | Y112 |
| Y113 | Y114 | Y115 | Y116 | Y117 | Y118 | Y119 | Y120 | Y121 | Y122 | Y123 | Y124 | Y125 | Y126 | Y127 | Y128 |
| Y129 | Y130 | Y131 | Y132 | Y133 | Y134 | Y135 | Y136 | Y137 | Y138 | Y139 | Y140 | Y141 | Y142 | Y143 | Y144 |
| Y145 | Y146 | Y147 | Y148 | Y149 | Y150 | Y151 | Y152 | Y153 | Y154 | Y155 | Y156 | Y157 | Y158 | Y159 | Y160 |
| Y161 | Y162 | Y163 | Y164 | Y165 | Y166 | Y167 | Y168 | Y169 | Y170 | Y171 | Y172 | Y173 | Y174 | Y175 | Y176 |
| Y177 | Y178 | Y179 | Y180 | Y181 | Y182 | Y183 | Y184 | Y185 | Y186 | Y187 | Y188 | Y189 | Y190 | Y191 | Y192 |
| Y193 | Y194 | Y195 | Y196 | Y197 | Y198 | Y199 | Y200 | Y201 | Y202 | Y203 | Y204 | Y205 | Y206 | Y207 | Y208 |
| Y209 | Y210 | Y211 | Y212 | Y213 | Y214 | Y215 | Y216 | Y217 | Y218 | Y219 | Y220 | Y221 | Y222 | Y223 | Y224 |
| Y225 | Y226 | Y227 | Y228 | Y229 | Y230 | Y231 | Y232 | Y233 | Y234 | Y235 | Y236 | Y237 | Y238 | Y239 | Y240 |
| Y241 | Y242 | Y243 | Y244 | Y245 | Y246 | Y247 | Y248 | Y249 | Y250 | Y251 | Y252 | Y253 | Y254 | Y255 | Y256 |

DISTANCE MEASUREMENT AND PHOTOMETRY DEVICE, DISTANCE MEASUREMENT AND PHOTOMETRY METHOD, AND IMAGING APPARATUS

CROSS REFERENCE TO RELATED APPLICATIONS

This application claims the benefit of priority under 35 USC §119 from Japanese Patent Application No. 2010-175870, filed Aug. 5, 2010, and Japanese Patent Application No. 2011-096919, filed Apr. 25, 2011, the entire contents of which are incorporated herein by reference.

BACKGROUND OF THE INVENTION

1. Field of the Invention

The present invention relates to a distance measurement and photometry device, a distance measurement and photometry method, and an imaging apparatus.

2. Description of the Related Art

Heretofore, in an external measurement type of a distance measurement and photometry device, a device is known that has a pair of distance measurement line sensors and multiple sensors as a photometry sensor (for example, see Japanese Patent No. 4217491). The device has two cameras that comprise a pair of distance measurement line sensors corresponding to a pair of lens, detects a parallax of a subject captured by the two cameras, and measures a distance to a subject by triangulation.

Japanese Patent No. 4217491 describes a pair of distance measurement line sensors and a large sensor as a photometry sensor on a semiconductor chip. Referring to the Japanese Patent No. 4217491, on the semiconductor chip, the center of the large sensor as a photometry sensor is displaced with reference to the line linking the center of one of the pair of distance measurement line sensors and the center of the other of the pair of distance measurement line sensors, so that it can reduce the semiconductor chip size and the size of a distance measurement and photometry device.

Additionally, a distance measurement and photometry device is known that has a pair of distance measurement line sensors, divided into plural areas, and measures a distance to a subject by use of the plural areas. The device measures a distance to a subject again if the electric charge of the camera is not enough, radiates strobe light and fill light while charging electricity of the camera. By doing so, the device can measure a distance to a subject even if it is cloudy. For example, see Japanese Publication No. 2005-227750.

However, Japanese Patent No. 4217491 and Japanese Publication No. 2005-227750 can measure the center part of a view only because they are configured to measure a distance by use of a pair of distance measurement line sensors. In other words, they cannot measure plural distances over a photographing screen entirety. To measure the plural distances, a two-dimensional image sensor is required. When the two-dimensional image sensor is used, an accuracy of measuring a distance needs to be greater than when using the pair of distance measurement line sensors to measure the plural distances over a photographing screen entirety.

The physical characteristics of a two-dimensional image sensor are different from a result of measuring a distance due to the state of lighting environment of a subject. Especially, an accuracy of measuring a distance is affected by a light source, and strongly affected under a lighting environment of fluorescent light.

TABLE 1

| | POWER FREQUENCY |
|---|---|
| UNITED STATES | 60 Hz |
| UNITED KINGDOM | 50 Hz |
| CHINA | 50 Hz |
| JAPAN | 50/60 Hz |

TABLE 1 shows differences of power frequencies of commercial power supplies. The power frequencies of commercial power supplies are roughly classified into 50 Hz or 60 Hz.

When a two-dimensional image sensor is used, the image sensor exposes a fixed frame rate as, for example 30 fps (frames per second), and continuously repeats a light-dark cycle due to a timing of exposure.

In general, this phenomenon is called flicker-phenomenon. When a distance is measured by use of a pair of two-dimensional image sensors under a lighting environment in which flicker occurs, due to a timing of exposure, an unevenness of exposure arises because the subject image that is formed in one of the pair of two-dimensional image sensors gets dark or gets light. Therefore, the brightness of the subject images that are formed in the pair of two-dimensional image sensors becomes imbalanced. Even if the pair of two-dimensional image sensors are synchronized with each other and measure a distance, a gap of timing of exposure between the two sensors slightly arises.

Also, when a light source gets dark, the exposure amount of an image sensor needs to be increased. For a two-dimensional image sensor, which is required to synchronize and transfer to each pixel line, the image sensor may only expose a certain amount of frame rate. Therefore, an exposure amount and a frame rate corresponding to a subject need to be varied.

BRIEF SUMMARY

It is an object of the embodiments disclosed herein to at least partially solve the problems in the conventional technology.

According to an aspect of the embodiments disclosed herein, there is provided a distance measurement and photometry device, a distance measurement and photometry method, and an imaging apparatus which can vary an exposure amount and a frame rate corresponding to a subject.

In particular, one embodiment provides a distance measurement and photometry device that includes a pair of distance measurement sensors, each of which is a two-dimensional image sensor, a photometry sensor, which includes a two-dimensional image sensor, a pair of distance measurement lenses, arranged to correspond to the pair of distance measurement sensors, a photometry lens arranged to correspond to the photometry sensor, a photometry process unit configured to calculate a brightness value of a subject, an exposure state setting unit configured to set an exposure state corresponding to at least the pair of distance measurement sensors, a distance measurement unit configured to measure a distance to the subject, wherein the exposure state setting unit is configured to alternate an exposure state of at least the pair of distance measurement sensors corresponding to a result of the photometry process unit.

Also, one embodiment provides a distance measurement and photometry method, implemented by a distance measurement and photometry device that includes a pair of distance measurement sensors, which includes a two-dimensional image sensor, a photometry sensor, which includes a two-dimensional image sensor, a pair of lenses for a distance measurement which are arranged to correspond to the pair of distance measurement sensors, and a photometry lens arranged to correspond to the photometry sensor, the method comprising performing a photometry process based on a brightness value of a subject, setting an exposure state of at least the pair of distance measurement sensors based on a result of the photometry process, and measuring a distance to the subject based on the exposure state.

Also, one embodiment provides an imaging apparatus including an imaging unit configured to capture an image, a pair of distance measurement sensors, each of which is a two-dimensional image sensor, a photometry sensor, which includes a two-dimensional image sensor, a pair of distance measurement lenses arranged to correspond to the pair of distance measurement sensors, a photometry lens arranged to correspond to the photometry sensor, a photometry process unit configured to calculate a brightness value of a subject, an exposure state setting unit configured to set an exposure state corresponding to at least the pair of distance measurement sensors, a distance measurement unit configured to measure a distance to the subject, wherein the exposure state setting unit is configured to alternate an exposure state of at least the pair of distance measurement sensors corresponding to a result of the photometry process unit.

BRIEF DESCRIPTION OF THE DRAWINGS

FIG. 8 illustrates a diagram showing the photometry sensor, shown in FIG. 1B, divided into plural areas;

DETAILED DESCRIPTION

Hereinafter, a distance measurement and photometry device, distance measurement and photometry method, and an imaging apparatus according to the disclosed embodiments will be described with reference to the drawings.

Figure 1A:
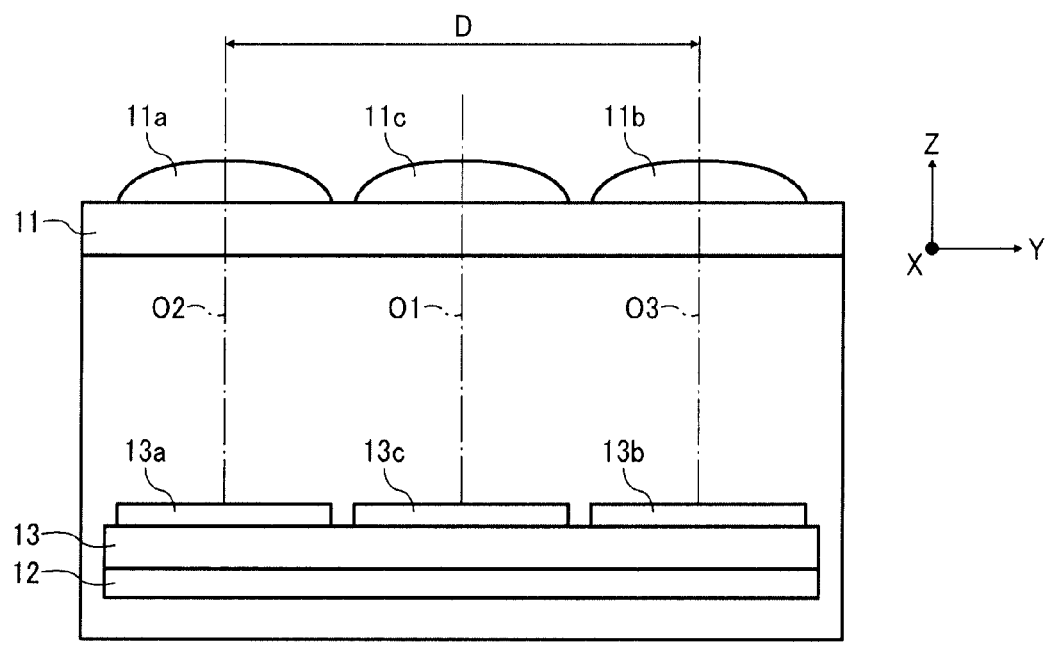
FIG. 1A illustrates a cross-sectional diagram showing the appearance of a distance measurement and photometry device.
Figure 1B:
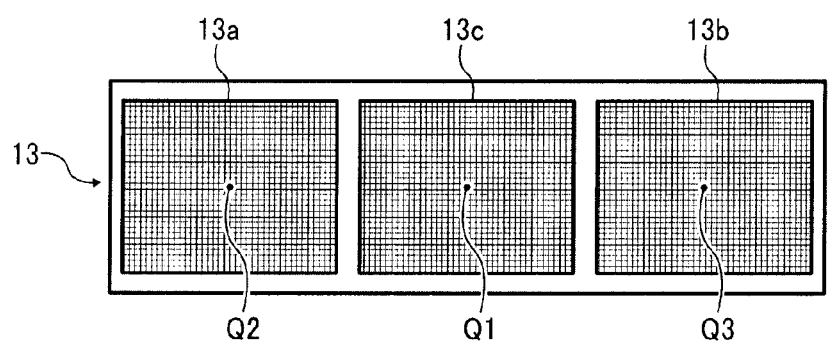
FIG. 1B illustrates a plan diagram showing the appearance of a distance measurement and photometry device.

FIG. 1A illustrates a cross-sectional diagram of a distance measurement and photometry device. FIG. 1B illustrates a plan diagram of the distance measurement and photometry device. Referring to FIG. 1A, the distance measurement and photometry device includes a lens array part 11, a circuit board 12, and an image sensor 13. The lens array part 11 includes distance measurement lenses 11a and 11b, and a photometry lens 11c, which are molded to each other.

Optical axes O2 and O3 of the distance measurement lenses 11a and 11b, and an optical axis O1 of the photometry lens 11c are parallel to each other. The optical axis direction is a Z-direction, and a plan face perpendicular to the Z-axis is an X-Y coordinate plane. The distance measurement lenses 11a and 11b are spaced in a Y-direction and are symmetric about the optical axis O1 of the photometry lens 11c.

The Y-direction is a direction occurring parallax Δ of the distance measurement lenses 11a and 11b.

The distance measurement lenses 11a and 11b have the same shape and focal length. The spacing between the optical axis O1 and the optical axis O2 is a distance D (base-line length). The photometry lens 11c has a different shape from the distance measurement lenses 11a and 11b. The image sensor 13 comprises a CMOS or CCD, and is formed of many light-sensitive elements on a wafer by a semiconductor process. This embodiment will be described assuming use of a CCD.

Formed on the image sensor 13 are an imaging area 13a on which is formed an image of a subject by use of the distance measurement lens 11a and which functions as one of a pair of distance measurement sensors, an imaging area 13b on which is formed an image of the subject by use of the distance measurement lens 11b and which functions as one of a pair of distance measurement sensors, and an imaging area 13c on which a light flux to detect the brightness of a subject is derived by use of the photometry lens 11c and which functions as a photometry sensor.

In this embodiment, the imaging areas 13a and 13b are a pair of sensors, but there may be two or more pairs of sensors. Also, in this embodiment, the imaging area 13c is one sensor. However, if the imaging areas 13a and 13b are two or more pairs of sensors, the imaging area 13c may be at least one sensor corresponding to each pair of sensors.

Also, if plural imaging areas 13c of a photometry sensor are formed on a wafer, plural photometry lenses corresponding to the plural imaging areas 13c are formed, and the angle of view of the plural photometry lenses may be different from each other. In this way, a photometry process can be performed corresponding to photographing the angle of view from wide-view to tele-view, with improved accuracy.

In this embodiment, the imaging areas 13a, 13b, and 13c are the same size rectangle, as shown in FIG. 1B. Each of the imaging areas 13a, 13b, and 13c are spaced in the Y-direction corresponding to the gap of the lenses 11a, 11b, and 11c, so that centers Q1, Q2, and Q3 of the diagonal line of each the imaging areas 13a, 13b, and 13c and the optical axes O2, O3, and O1 of each of the lens 11a, 11b, and 11c correspond in positional relationship approximately. The imaging area 13c is placed in the middle of the imaging areas 13a and 13b, and the distance D can be a long distance.

This optical system is modularized with the circuit board 12 as a distance measurement and photometry module, and the imaging areas 13a, 13b, and 13c are spaced from each other. Therefore, even when modularized, this design can prevent the light flux through the lens 11c corresponding to the imaging area 13c from entering into the imaging area 13a, and the light flux through the lens 11a corresponding to the imaging area 13a from entering into the imaging area 13c, in the adjacent imaging areas 13a and 13c, without placing a wall of light interception between the imaging areas 13a and 13c. Also, this embodiment can prevent the light flux through the lens 11c corresponding to the imaging area 13c from entering into the imaging area 13b, and the light flux through the lens 11b corresponding to the imaging area 13b from entering into the imaging area 13c, in the adjacent imaging areas 13b and 13c, without placing a wall of light interception between the imaging areas 13b and 13c.

Figure 2:
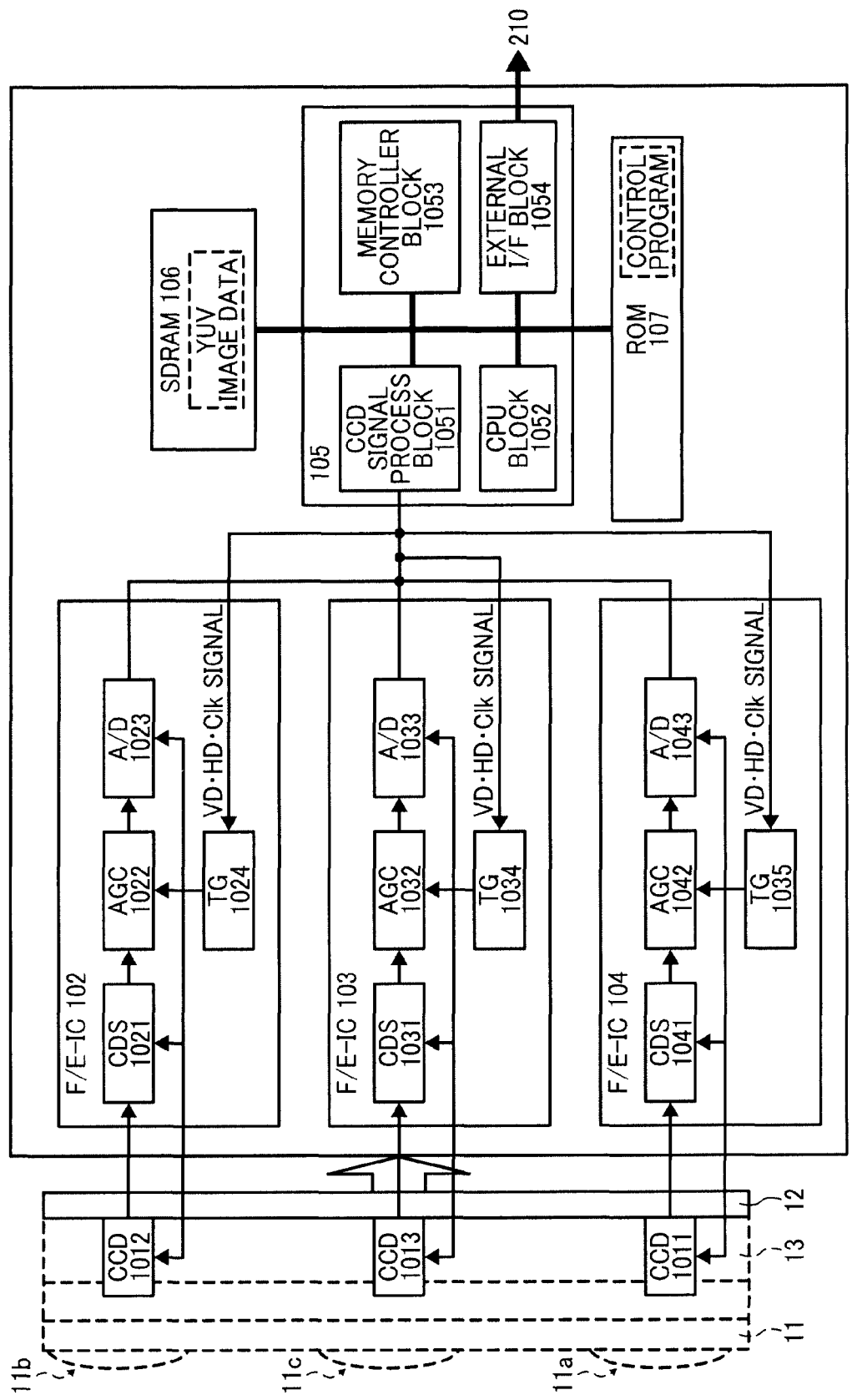
FIG. 2 illustrates a block diagram, which describes a relationship to the distance measurement and photometry lens shown in FIGS. 1A and 1B, showing the hardware configuration of a distance measurement and photometry device.

The circuit board 12 includes a circuit including a digital signal processor (DSP). The image sensor 13 is placed on the circuit board 12. FIG. 2 illustrates a block diagram of the circuit board 12. The output signal of the image sensor 13 is processed by a processor 105, as shown in FIG. 2.

The processor 105 includes a CCD signal process block 1051, a CPU block 1052, a memory controller block 1053, and an external I/F block 1054. Blocks 1051-1054 are connected to each other by a bus line. External to the processor 105, is a SDRAM 106, which stores YUV image data, and a ROM 107, which stores a control program. The SDRAM 106 and ROM 107 are connected to the processor 105 by a bus line.

The imaging area 13a corresponds to a CCD 1011 as a sensor for measuring a distance, the imaging area 13b corresponds to a CCD 1012 as a sensor for measuring a distance, and the imaging area 13c corresponds to a CCD 1013 as a sensor for photometry. The circuit board 12 includes F/E-ICs (front end IC) 102, 103, and 104 corresponding to the CCDs 1012, 1013, and 1011. The subject image formed on the CCDs 1011-1013 is converted into photoelectrical signals and input into each of the F/E-ICs as an image signal.

The image signal from the CCD 1012 is input in the F/E-IC 102, the image signal from the CCD 1013 is input in the F/E-IC 103, and the image signal from the CCD 1011 is input in the F/E-IC 104.

The F/E-ICs 102-104 are well known, and each includes a CDS (correlation double sampling section) (see 1021, 1031, and 1041), an ADC (automatic gain controller) (see 1022, 1032, and 1042), and an A/D (analog to digital converter) (see 1023, 1033, and 1043). The F/E-ICs 102-104 each convert an analog signal into a digital signal, which is output to the CCD signal process block 1051 in the processor 105.

These signal processes are performed via TGs (timing generator) 1024, 1034, and 1035 by a VD/HD/CLK signal output from the CCD signal process block 1051. The control program stored in the ROM 107 is programmed so that the CCD signal process block 1051 can control the CCD 1011 as a sensor for measuring a distance, the CCD 1012 as a sensor for measuring a distance, and the CCD 1013 as a sensor for photometry.

Figure 3:
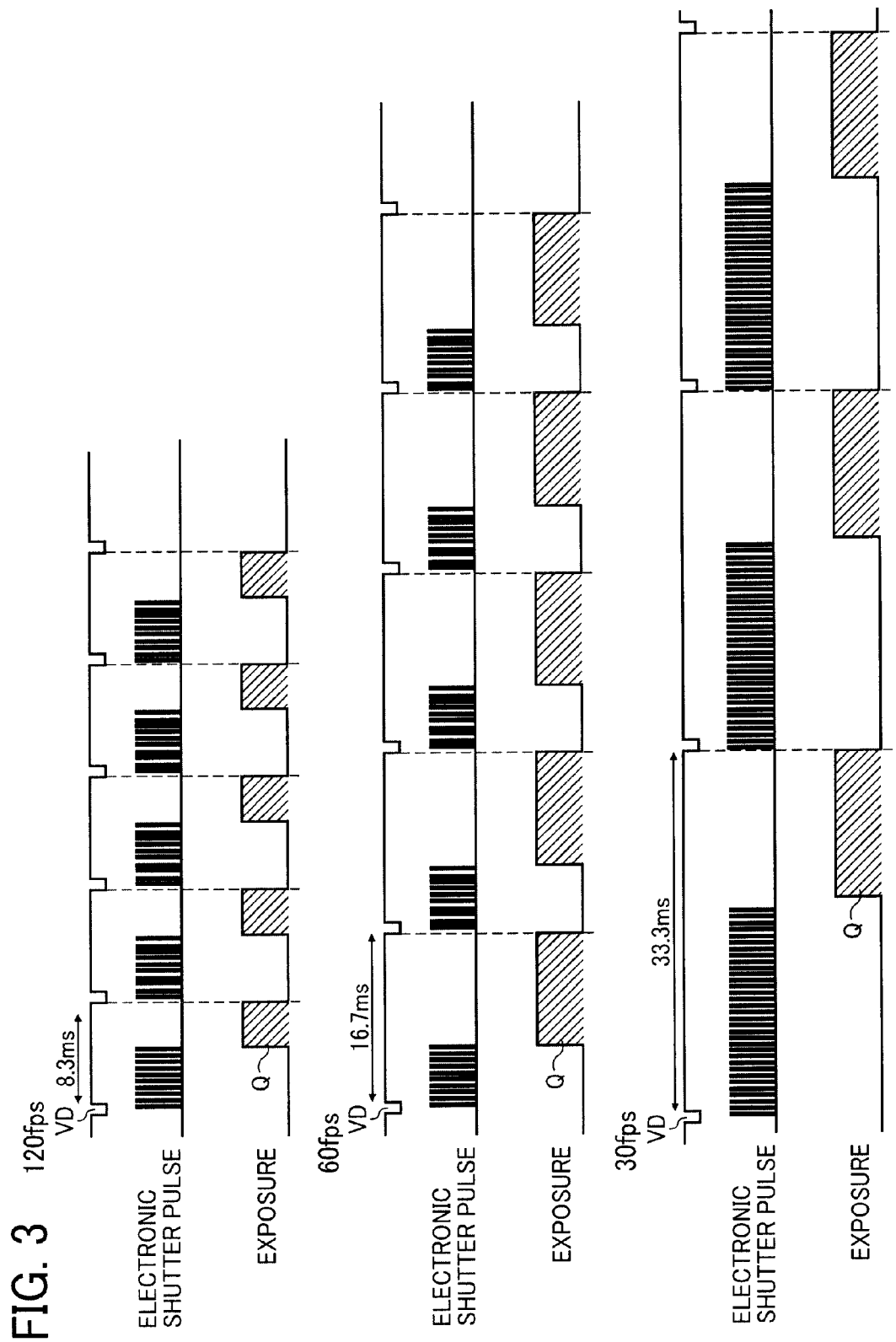
FIG. 3 is a timing chart illustrating a relationship between frame rate and exposure amount of a distance measurement and photometry device.

The timing for getting the image signals of CCDs 1011-1013 is controlled in synchronization with the VD signal, and the timing (hereinafter, frame rate) can be selected to be 120 fps (frames per second), 60 fps, or 30 fps. FIG. 3 is a timing chart illustrating a relationship between frame rate and exposure amount Q of a distance measurement and a photometry device. The frame rate and the exposure amount Q can be controlled by setting the interval of the VD signal and the electronic shutter pulse.

Figure 4:
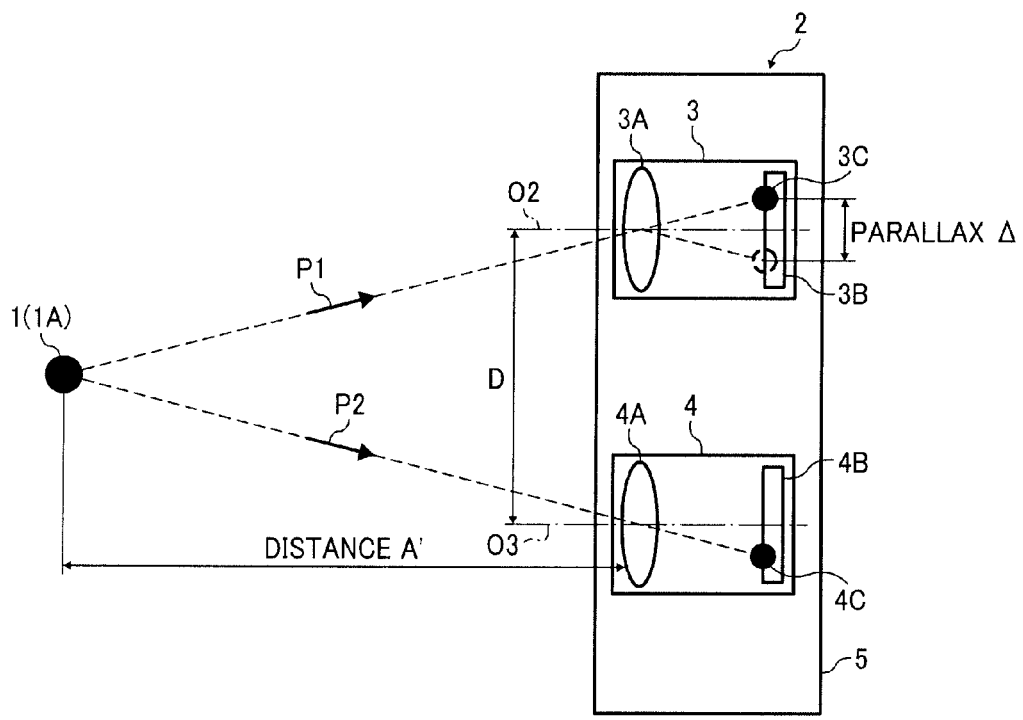
FIG. 4 illustrates a diagram showing a principle of detecting parallax by use of a pair of line sensors.
Figure 5A:
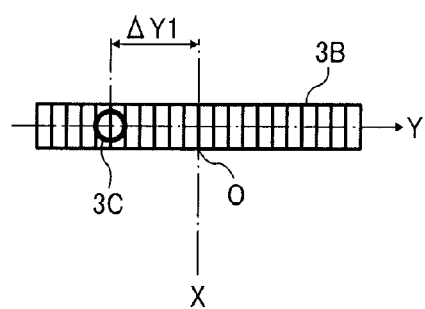
FIG. 5A illustrates a diagram showing a relationship between a subject image and parallax formed in the pair of line sensors shown in FIG. 4.
Figure 5B:
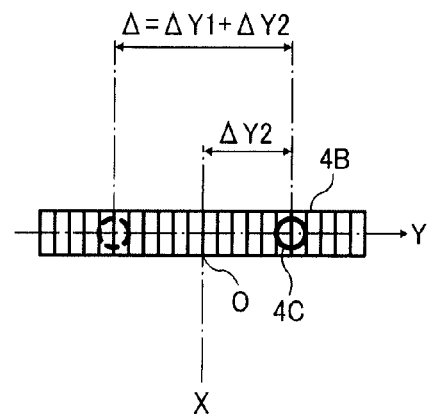
FIG. 5B illustrates a diagram showing a relationship between a subject image and parallax formed in the pair of line sensors shown in FIG. 4.

Next, the basic principle for distance measurement will be described. FIG. 4, FIG. 5A, and FIG. 5B illustrate diagrams showing a principle of a distance measurement device. Hereinafter, the basic principle for distance measurement by use of a line sensor as a light-sensitive element will be described, and when a two-dimensional image sensor is used, the basic principle for distance measurement is similar.

FIG. 4 shows a subject 1, a distance measurement device 2, and a distance A'. The distance A' is a distance from the subject 1 to the distance measurement device 2. In particular, the distance A' is a distance from the subject 1 to the principal point of a distance measurement lens. The distance measurement device comprises a first distance measurement optical system 3 and a second distance measurement optical system 4.

The first distance measurement optical system 3 includes a distance measurement lens 3A and a distance measurement light-sensitive element 3B. The second distance measurement optical system 4 includes a distance measurement lens 4A and a distance measurement light-sensitive element 4B. The first distance measurement optical system 3 and the second distance measurement optical system 4 are fixed on a fixed base 5. The distance measurement light-sensitive element 3B and the distance measurement light-sensitive element 4B comprise, as shown in FIG. 5A and FIG. 5B, many pixels spaced with a predetermined interval.

An optical axis O2 of the first distance measurement optical system 3 and a optical axis O3 of the second distance measurement optical system 4 are parallel to each other. The distance from the optical axis O2 to the optical axis O3 is a distance (base-line length) D, as shown in FIG. 4.

Hereinafter will be described a process of measuring the subject 1 by use of the distance measurement device 2, i.e., by use of the first distance measurement optical system 3 and the second distance measurement optical system 4.

A light flux P1 from the subject 1 forms an image at a pixel 3C of the distance measurement light-sensitive element 3B via the distance measurement lens 3A of the distance measurement first optical system 3. A light flux P2 from the subject 1 forms an image at a pixel 4C of the distance measurement light-sensitive element 4B via the distance measurement lens 4A of the first distance measurement optical system 4. The subject image formed on the pixels 3C and 4C is converted into an electrical signal and input in a circuit for calculating a distance.

1A of the subject 1 is, due to parallax, different from the receiving position between the pixel 3C of the distance measurement light-sensitive element 3B and the pixel 4C of the distance measurement light-sensitive element 4B. The parallax occurs at a declination of vertical direction for each of the optical axes O2 and O3, in the plane face including the optical axes O2 and O3.

When a focusing length of the distance measurement lenses 3A and 4A is f, and the distance A' is longer than the focusing length f of the distance measurement lenses 3A and 4A, in other words, A'>>f, the following formula holds.

$$A' = D \times (f / \Delta) \quad (1)$$

The distance D and the focusing length f of the distance measurement lenses 3A and 4A are given, and if the value of the parallax $\Delta$ is known, the distance A' from the subject 1 to the distance measurement device 2 can be calculated by use of the formula 1. The parallax $\Delta$ is, as shown in FIG. 5A and FIG. 5B, obtained by calculating the positions of the pixels 3C and 4C. In each of FIG. 5A and FIG. 5B, a circle mark shows the same point of the subject 1 formed at the position of the pixels 3C and 4C. In addition, a circle mark with broken lines in the distance measurement light-sensitive element 4B virtually shows an image of the subject formed in the distance measurement light-sensitive element 3B.

The parallax $\Delta$ is calculated by adding a shift length $\Delta$ Y1 in the lateral direction, from the center O of the pixel of the distance measurement light-sensitive element 3B to the pixel 3C, and a shift length $\Delta$ Y2 in the lateral direction, from the center O of the pixel of the distance measurement light-sensitive element 4B to the pixel 4C. In this way, the method for calculating the distance A' by use of the parallax $\Delta$ of two images is a triangulation method.

The distance measurement and photometry device disclosed herein uses a two-dimensional image sensor. The device calculates the parallax by applying the principle of triangulation to the two-dimensional image sensor. By dividing the two-dimensional image sensor into plural areas, the parallax of each of the plural areas can be calculated, and the shift length of the parallax can be calculated based on the average of the parallax of all the plural areas.

Figure 6:
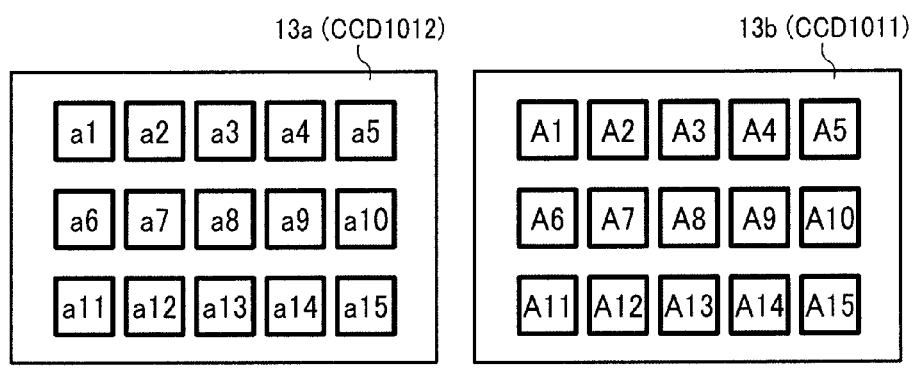
FIG. 6 illustrates a diagram showing the distance measurement sensor, shown in FIG. 1B, divided into plural areas.

FIG. 6 illustrates a diagram showing the distance measurement sensor shown in FIG. 1B in a state of being divided into plural areas. In detail, FIG. 6 shows the imaging areas 13a and 13b (the CCD 1012 and the CCD 1011) being divided into square areas, 5×3. The shift length of the parallax can be calculated as follows.

Figure 7:
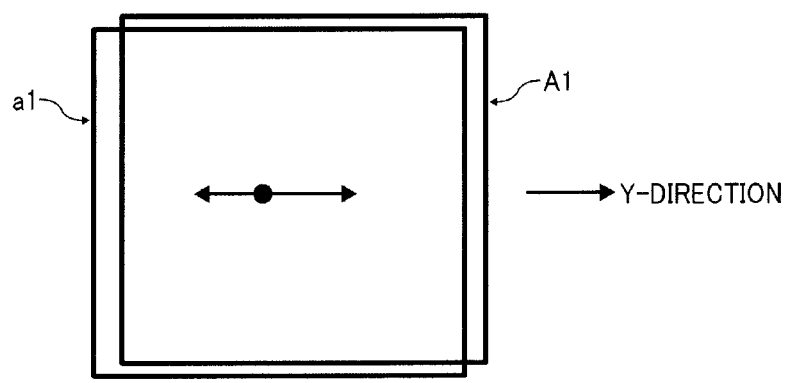
FIG. 7 illustrates a diagram showing a sample of parallax calculation by use of each area shown in FIG. 6.

As shown in FIG. 6, an area a1 of the CCD 1012 and an area A1 of the CCD 1011 are, as shown in FIG. 7, shifted in steps of plural pixels in the Y-direction (or horizontal direction), a difference of the brightness of the pixels of the areas a1 and A1 is calculated, and a difference of the position in which the difference is the most small is determined as the parallax of the areas a1 and A1.

The parallax of the other areas a2-a15 and A2-A15 are calculated in the same way, and an average of the parallax is calculated by dividing a summation of each of the parallaxes by the number of divided areas. A distance from the subject to the distance measurement device can be calculated based on the average of the parallax and the formula 1.

A photometry sensor is obtained by dividing the CCD 1013 into plural square areas, and then using the divided CCD to measure the brightness of the divided areas. FIG. 8 shows an example of the CCD 1013 being divided as a photometry sensor into square areas, 16×16. The divided areas are numbered by the symbols "Y1"-"Y256".

The image signal output from the CCD 1013 is input into the CCD signal process block 1051 via the F/E-IC 103, and stored in the SDRAM 106 temporally. The brightness Y in each of the divided areas is calculated based on the YUV signal in the SDRAM 106, the brightness values Y multiplied by the number of the pixels of each of the divided areas are added together and the estimation value of the photometry is determined.

An appropriate exposure amount is calculated based on the brightness distribution obtained by the value of the photometry, which measures the brightness of a subject. As a result, in case of a too bright or a too dark condition, the TG 1034 is controlled by an exposure state setting unit, so as to alter the electronic shutter pulse, and to alternate an exposure amount (i.e., exposure time or shutter speed), due to the control regulation of the TG 1034.

Next, embodiments of a distance measurement and photometry device will be described in detail.

The First Embodiment

In the first embodiment, a frame rate of the CCD 1013 as a photometry sensor and the CCDs 1012 and 1011 as distance measurement sensors is 60 fps, and the frame rate is fixed.

A control program for performing the following functionality is stored in the ROM 107.

Figure 9:
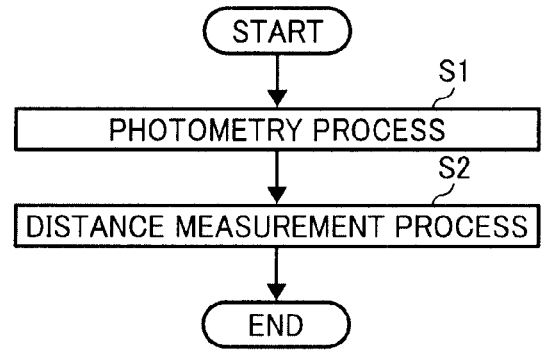
FIG. 9 is a flowchart illustrating steps of a distance measurement and photometry method of a distance measurement and photometry device.

FIG. 9 is a flowchart illustrating steps executed by a distance measurement and photometry method of a distance measurement and photometry device. The processor 105 performs photometry functions in corporation with the F/E-IC 103, and exposure state setting functions for setting an exposure state of a photometry sensor and at least a pair of distance measurement sensors. As shown in FIG. 9, the processor 105 performs a photometry process (S1), sets an exposure condition based on the photometry process (S1), and performs a distance measurement process (S2).

Figure 10:
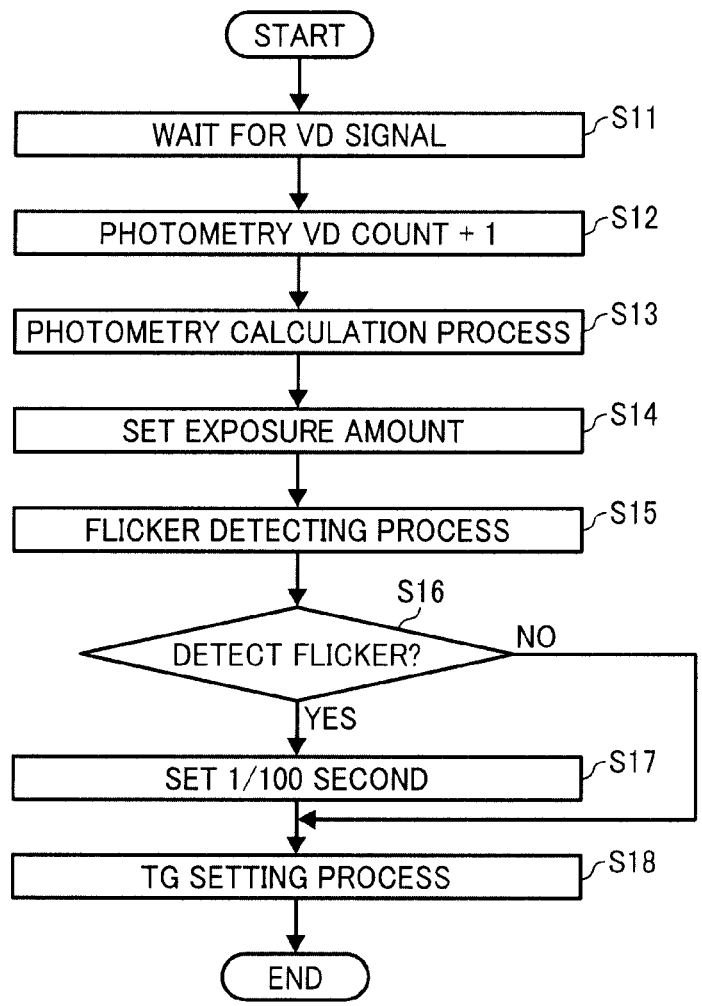
FIG. 10 is a flowchart illustrating a photometry process of the first embodiment, and a detail of the photometry process step shown in FIG. 9.

FIG. 10 is a flowchart illustrating the photometry process (S1). The processor 105 waits for a VD signal for determining a timing of exposure of each frame (S11). The processor 105 adds one to a value of a photometry VD count due to the occurrence of the VD signal (S12).

In the distance measurement and photometry device of the first embodiment, the F/E-ICs 102-104 are placed independently, and the VD signals to the F/E-ICs 102-104 occur at different times. The occurrence timings of the VD signals are different from the CCD 1013 as a photometry sensor and the CCDs 1012 and 1011 as distance measurement sensors. Therefore, in the first embodiment, the value of the photometry VD count is based on the VD signal of the CCD 1013 as a photometry sensor.

The reason for counting the photometry VD count is that at least three brightness values continuously obtained by the occurrence of the VD signal are needed for judging whether flicker occurs or not, as will be discussed below.

The image signal obtained by the exposure is input to the CCD signal process block 1051, and then converted to a YUV image signal by the CCD signal process block 1051.

The processor 105 calculates the above-mentioned estimation value of the photometry based on the YUV image signal (S13).

The processor 105 calculates a brightness value Y of a subject by the estimation value, sets an exposure amount, for example, shutter speed or exposure time, of the CCD 1013 as a photometry sensor so that the brightness value Y becomes a value corresponding to an appropriate exposure (S14). Next, the processor 105 performs a flicker detecting process that detects whether a subject exists or not under a lighting environment in which flicker is occurring (S15).

Figure 12:
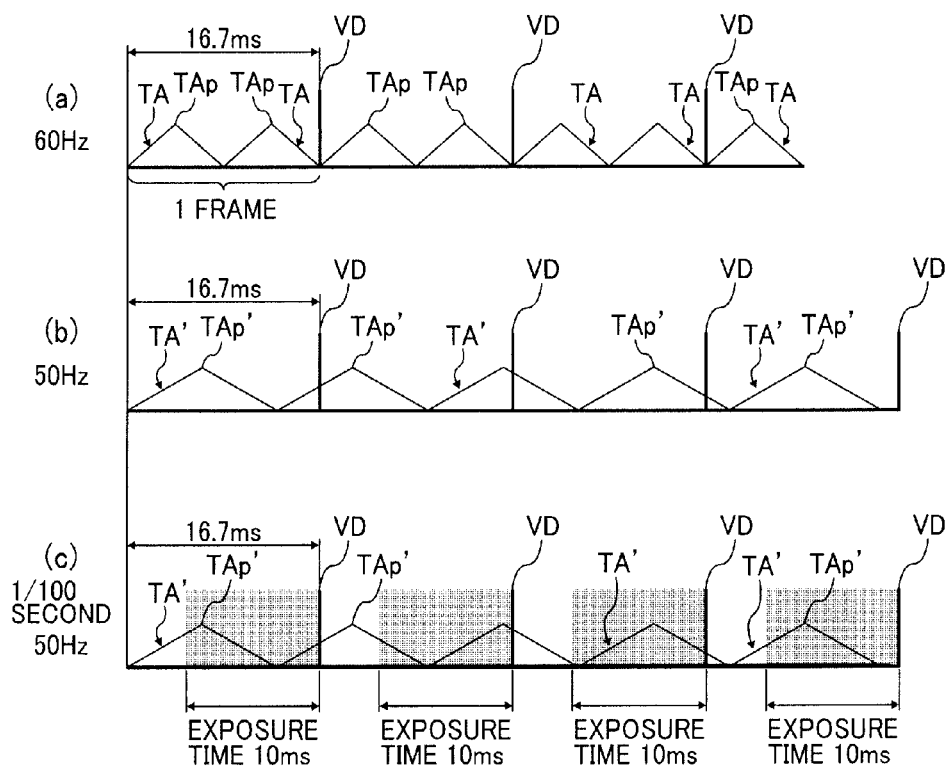
FIG. 12A illustrates a schematic diagram showing a relationship between cycles of fluorescent light in 60 Hz and VD signals of an image sensor.
FIG. 12B illustrates a schematic diagram showing a relationship between cycles of fluorescent light in 50 Hz and VD signals of an image sensor.
FIG. 12C illustrates a schematic diagram showing a relationship between cycles of fluorescent light in 50 Hz and VD signals of an image sensor.

For describing the flicker detecting process, a relationship between the brightness value Y and the VD signal, which are obtained under a lighting environment in which flicker is occurring, will be described. FIGS. 12A to 12C illustrate a schematic diagram showing a relationship between cycles of fluorescent light and VD signals of an image sensor;

As shown in FIG. 12A, a triangle TA shows a light-emitting state of fluorescent light that emits light at 60 Hz, and a symbol "Tap" shows a peak of the light-emitting. As shown in FIG. 12B, a triangle TA' shows a light-emitting state of fluorescent light that emits light at 50 Hz, and a symbol "Tap'" shows a peak of the light-emitting.

A fluorescent light, as is well known, has twice the light-emitting cycle as the power frequency. When the power frequency is 60 Hz, lighting-up or lighting-down of a fluorescent light is repeated 120 times per second. When the power frequency is 50 Hz, lighting-up or lighting-down of a fluorescent light is repeated 100 times per second.

In addition, as shown in FIG. 12A, a timing at which a VD signal occurs and a timing at which a fluorescent light lights down correspond to each other. However, the timing at which a fluorescent light lights down is generally losing time a little with respect to the timing at which a VD signal occurs, due to a timing at which a photometry starts.

TABLE 2

|  | LAST BUT ONE Y-VALUE | PREVIOUS Y-VALUE | CURRENT Y-VALUE |
| --- | --- | --- | --- |
| PATTERN 1 | SMALL | SMALL | BIG |
| PATTERN 2 | SMALL | BIG | SMALL |
| PATTERN 3 | BIG | SMALL | SMALL |

Under a lighting environment in which flicker is occurring, a brightness value (brightness level) Y obtained by the photometry process is repeated at a high level and a low level alternately. As shown in TABLE 2, there are three patterns that a fluorescent light Y repeats at a high level and a low level alternately, with respect to a relationship between a timing at which a photometry starts, a light-emitting cycle of fluorescent light, a frame rate, and a photometry time.

TABLE 2 shows a variational pattern of a previous brightness value Y (Y-value) and a last but one brightness value Y (Y-value) on the basis of a current brightness value Y (Y-value). The pattern 1 is a pattern in which the last but one Y-value, the previous Y-value, and the current Y-value are, in order small, small, and big. The pattern 2 is a pattern in which the last but one Y-value, the previous Y-value, and the current Y-value are, in order, small, big, and small. The pattern 3 is a pattern in which the last but one Y-value, the previous Y-value, and the current Y-value are in order big, small, and small.

Figure 13:
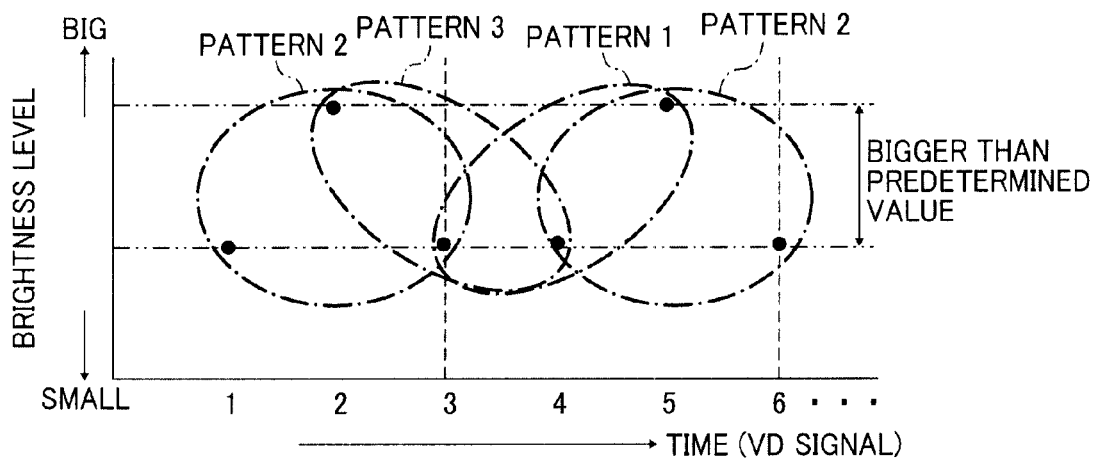
FIG. 13 is a graph illustrating a variance of brightness received by the photometry sensor shown in FIG. 1B.

FIG. 13 shows a relationship between a brightness value Y (brightness level) of an image signal obtained by the CCD 1013 for a photometry sensor and a number of times of obtaining a brightness value Y (in other words, VD signal number of times), wherein the horizontal axis shows the number of times of a brightness value Y, and the vertical axis shows a size of a brightness value Y (brightness level). The brightness levels of an image signal for which a number of times are from "1" to "6" are dotted on FIG. 13.

When a number of times of a brightness value Y is three times, the current Y-value is small, the previous Y-value is big, and the last but one Y-value is small. Therefore, a pattern of the brightness values of the last but one, the previous, and the current is pattern 2, in order, small, big, and small.

When a number of times of a brightness value Y are four times, the current Y-value is small, the previous Y-value is small, and the last but one Y-value is big. Therefore, a pattern of the brightness values of the last but one, the previous, and the current is pattern 3, in order, big, small, and small.

When a number of times of a brightness value Y is five times, the current Y-value is big, the previous Y-value is small, and the last but one Y-value is small. Therefore, a pattern of the brightness values of the last but one, the previous, and the current is pattern 1, in order, small, small, and big. When a number of times of a brightness value Y is six times, the current Y-value is small, the previous Y-value is big, and the last but one Y-value is small. Therefore, a pattern of the brightness values of the last but one, the previous, and the current is pattern 2, in order, small, big, and small.

Thus, there are three variational patterns of brightness values Y obtained by the photometry process. Occurring times of the VD signal are counted during the photometry process so that the pattern can be determined by use of at least three brightness values. Also, a predetermined value is, e.g., 30, when brightness value is expressed in 256 gray scales. If a brightness value is more than 30, it is determined the brightness value Y has changed.

Figure 11:
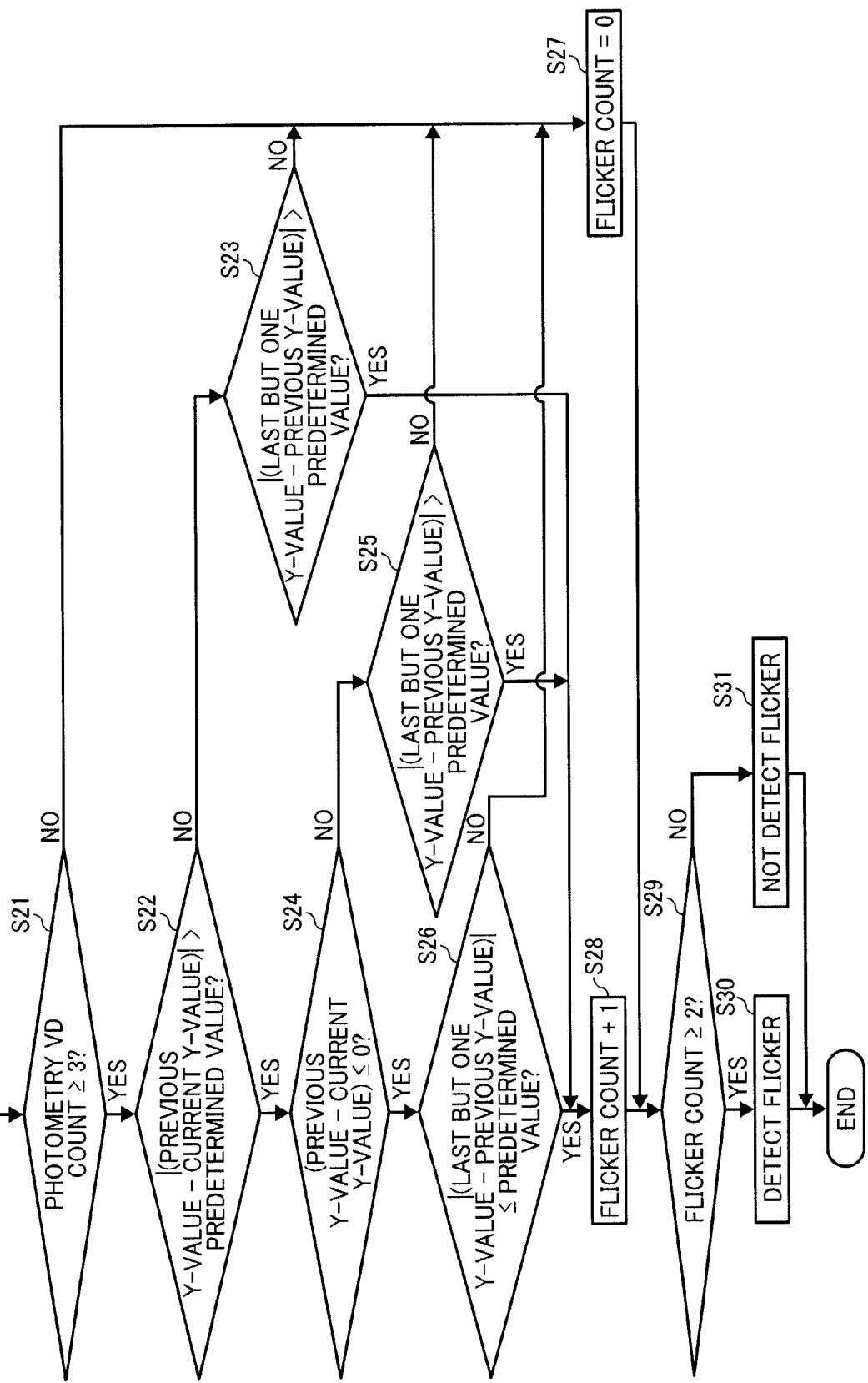
FIG. 11 is a flowchart illustrating a detail of the step of detecting flicker shown in FIG. 10.

FIG. 11 is a flowchart illustrating a detail of the flicker detecting process. The processor 105, as shown in FIG. 11, determines if a photometry VD count value of the VD signal of the CCD 1013 is greater than or equal to "3" (S21). If the photometry VD count value of the VD signal of the CCD 1013 is less than "3", the processor 105 sets a flicker count to "0" because it cannot determine the pattern (S27). Here, a flicker count "0" means flicker is not detected.

If a photometry VD count value of the VD signal of the CCD 1013 is 3 or more, the processor 105 calculates an absolute value of the difference of the previous Y-value and the current Y-value, and determines if the absolute value is greater than a predetermined value (S22). If "NO" is determined in step S22, the processor 105 calculates an absolute value of the difference of the last but one Y-value and the previous Y-value, and determines if the absolute value is greater than a predetermined value (S23).

If "NO" is determined in step S23, the processor 105 sets a flicker count to "0" (S27). If "YES" is determined in step S23, the processor 105 adds one to the flicker count value (S28). This means a light-dark change more than a predetermined value has occurred one time. The steps of S22 and S23 correspond to the determination of flicker of pattern 3.

If "YES" is determined in step S22, the processor 105 calculates an absolute value of the difference of the previous Y-value and the current Y-value, and determines if the absolute value is less than or equal to "0" (S24). If "NO" is determined in step S24, the processor 105 calculates an absolute value of the difference of the last but one Y-value and the previous Y-value, and determines if the absolute value is greater than a predetermined value (S25).

If "NO" is determined in step S25, the processor 105 sets the flicker count to "0" (S27). If "YES" is determined in step S25, the processor 105 adds one to the flicker count value (S28). The steps S24 and S25 correspond to the determination of flicker pattern 2.

If "YES" is determined in step S24, the processor 105 calculates an absolute value of the difference of the last but one Y-value and the previous Y-value, and determines if the absolute value is less than or equal to a predetermined value (S26). If "NO" is determined in step S26, the processor 105 sets the flicker count to "0" (S27). If "YES" is determined in step S26, the processor 105 adds one to the flicker count value (S28). The steps S24 and S26 correspond to the determination of flicker pattern 1.

Next, the processor 105 determines if flicker is occurring continuously. If the flicker count is equal to "2" or more (S29), the processor 105 determines to have detected flicker (S30). If the flicker count is less than "2", the processor 105 determines not to have detected flicker (S31).

Next, the processor 105 completes the flicker detecting process of FIG. 11, and moves to a step in which it determines if flicker has been detected, as shown in FIG. 10 (S16). In step S16, if flicker is occurring, the processor 105 sets an exposure time (e.g., exposure amount or shutter speed) of the CCDs 1012 and 1011 as distance measurement sensors to 1/100 second (S17).

If the processor 105 sets the exposure time to 1/100 second, it is known to be unaffected by flicker of a fluorescent light, even if a power frequency of a fluorescent light is 50 Hz or 60 Hz.

FIG. 12C shows a light-emitting state of fluorescent light, for a power frequency of 50 Hz, in which an exposure time is set to 1/100 second. In the first embodiment, when the power frequency of a fluorescent light is 60 Hz, flicker does not occur because a frame rate of the CCD 1013 as a photometry sensor is 60 fps. Furthermore, when the power frequency of a fluorescent light is 50 Hz, flicker does not occur because an exposure time of 1/100 second is the same as the light-emitting cycle of fluorescent light.

Therefore, in principle, by performing the photometry process, for an exposure time of 1/100 second, in a light-emitting cycle of fluorescent light in which the power frequency of the fluorescent light is 50 Hz, it is possible that flicker due to a fluorescent light or a light source similar to a fluorescent light does not occur. Therefore, the processor 105 alternates a state of exposure of the CCDs 1012 and 1011 as distance measurement sensors according to a result of the photometry process. Next, the processor 105 moves to the step of a TG setting process (S18), completes the photometry process of FIG. 10, and moves to the distance measurement process of FIG. 9 (S2).

Figure 14:
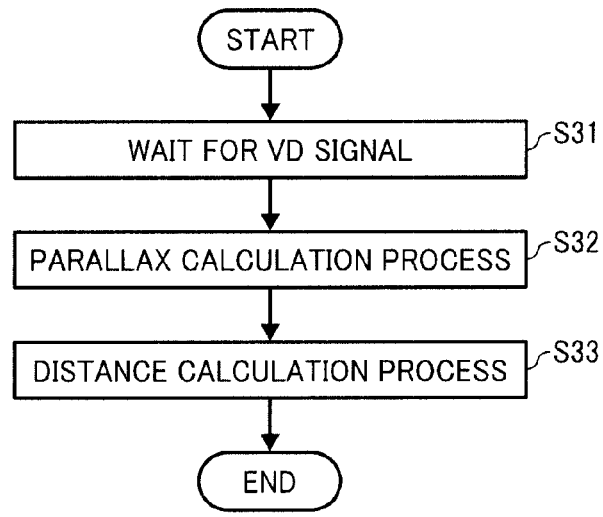
FIG. 14 is a flowchart illustrating a detail of the steps of the distance measurement process shown in FIG. 9.

In step S2, the processor 105 cooperates with the F/E-ICs 102 and 104, and measures a distance by use of the CCDs 1012 and 1011 as distance measurement sensors based on the an exposure time set by the photometry process (S1). FIG. 14 is a flowchart illustrating the steps of a distance measurement process. As shown in FIG. 14, the processor 105 waits for VD signals of the CCDs 1012 and 1011 as distance measurement sensors (S31). By this process, the processor 105 takes each image signal of one frame obtained by exposure of the CCDs 1012 and 1011 as distance measurement sensors.

Next, the CCD signal process block 1051 converts each image signal obtained by the exposure into a respective YUV image signal. The processor 105 performs a parallax calculation process based on each YUV image signal (S32), and performs a distance calculation process based on a result of the parallax calculation process (S33). The distance calculation process is performed for each the areas shown in FIG. 6, and a distance to a subject is calculated.

By performing a set of processes while a distance measurement and photometry device is executing, the device can constantly obtain the distance to a subject under a state of lighting environment of the subject. Thus, by detecting flicker during the photometry process, the device can resolve an exposure uniformity issue during a distance measurement, and the accuracy of the parallax calculation during a distance measurement is improved.

The Second Embodiment

The second embodiment of a distance measurement and photometry device will be described in detail. A frame rate of the CCD 1013 as a photometry sensor and the CCDs 1012 and 1011 as distance measurement sensors is initially 60 fps. A control program for performing the following functionality is stored in the ROM 107. A distance measurement and photometry device, similar to the first embodiment, performs the photometry process (S1) by use of the CCD 1013 as a photometry sensor, and performs the distance measurement process (S2) by use of the CCDs 1012 and 1011 as distance measurement sensors based on an exposure time obtained by the photometry process, as shown in FIG. 9. The distance measurement process is the same as in the first embodiment. Therefore, a detailed description of that process will not be repeated.

Next, a photometry process of the second embodiment will be described with reference to the flowchart of FIG. 15. The processor 105 waits for a VD signal for adapting a timing of exposure (S41), and adds one to a photometry VD count value (S42). In the device of the second embodiment, each VD signal of the CCDs 1011, 1012, and 1013 occurs because the F/E-ICs 102-104 of the device are placed independently. Therefore, a timing at which a VD signal occurs differs among the devices. In the same way of the first embodiment, here, the timing can be counted based on the VD signal of CCD 1013 as a photometry sensor.

Next, the CCD signal process block 1051 converts each image signal obtained by an exposure into a respective YUV image signal. The processor 105 calculates an estimation value as a photometry calculation process based on the YUV image signal (S43), and estimates a brightness value Y of a subject based on the estimation value, and sets an exposure amount (in other words, exposure time or shutter speed) for an appropriate exposure (S44).

Next, the processor 105 performs a flicker detecting process, which determines if a lighting environment of a subject is under flicker (S45). The flicker detecting process is the same as the first embodiment, therefore, a description of it will be skipped.

The processor 105 determines if flicker is detected after performing step S45 (S46). If flicker is detected, the processor 105 determines if a frame rate of the CCDs 1012 and 1011 as distance measurement sensors is 120 fps (S47).

If a frame rate of the CCDs 1012 and 1011 as distance measurement sensors is 120 fps, flicker cannot be avoided because an exposure time is a maximum of 1/120 second. Therefore, the processor 105 alternates a frame rate of the CCDs 1012 and 1011 as a distance measurement sensor, from 120 fps to 60 fps (S48).

In step S47, if the frame rate is not 120 fps, the processor 105 determines if a brightness value Y is greater than a first predetermined value (for example, Ev5) (S49). In step S49, if the brightness value Y is greater than the first predetermined value, the processor 105 sets a frame rate of the CCDs 1012 and 1011 as distance measurement sensors to 60 fps (S48). In step S49, if the brightness value Y is not greater than the first predetermined value, the processor 105 sets a frame rate of the CCDs 1012 and 1011 as distance measurement sensors to 30 fps (S50).

Next, the processor 105 sets an exposure time of the CCDs 1012 and 1011 for distance measurement to 1/100 second (S55). In step S46, if flicker is not detected, the processor 105 determines if a brightness value Y is greater than a second predetermined value (for example, Ev10), which is more than the first predetermined value (S51). In step S51, if the brightness value Y is greater than the second predetermined value, the processor 105 sets a frame rate of the CCDs 1012 and 1011 as distance measurement sensors to 120 fps (S52). Thus, an exposure can be performed in a high frame rate under a lighting environment of a subject of high brightness, such as bright sunshine, and the speed of measuring a distance can be improved to high-speed.

Next, in step S51, if the brightness value Y is not greater than the second predetermined value, the processor 105 determines if a brightness value Y is smaller than the first predetermined value (S53). In step S53, if a brightness value Y is smaller than the first predetermined value, the processor 105 sets a frame rate of the CCDs 1012 and 1011 as distance measurement sensors to 30 fps (S54). Thus, an exposure can be performed in a low frame rate under a lighting environment of a subject of low brightness, and a distance can be accurately measured.

The processor 105 performs a TG setting process after steps S52, S54, and S55 (S56). In addition, in step S53, if a brightness value Y is not smaller than the first predetermined value, the processor 105 moves to step S56, and performs the TG setting process.

Therefore, under a lighting environment in which flicker is occurring, flicker can avoid occurring because the processor 105 sets a frame rate of the CCDs 1012 and 1011 as distance measurement sensors to 60 fps, and sets an exposure time of the CCDs 1012 and 1011 as distance measurement sensors to $\frac{1}{100}$ second. Furthermore, under a lighting environment in which flicker is not occurring, the speed of measuring a distance can be improved to high-speed because the processor 105 sets a frame rate of the CCDs 1012 and 1011 as distance measurement sensors to a high frame rate, under a lighting environment of a subject of high brightness, and accurately measures a distance because the processor 105 sets a frame rate of the CCDs 1012 and 1011 as distance measurement sensors to a low frame rate, under a lighting environment of a subject of low brightness.

Figure 15:
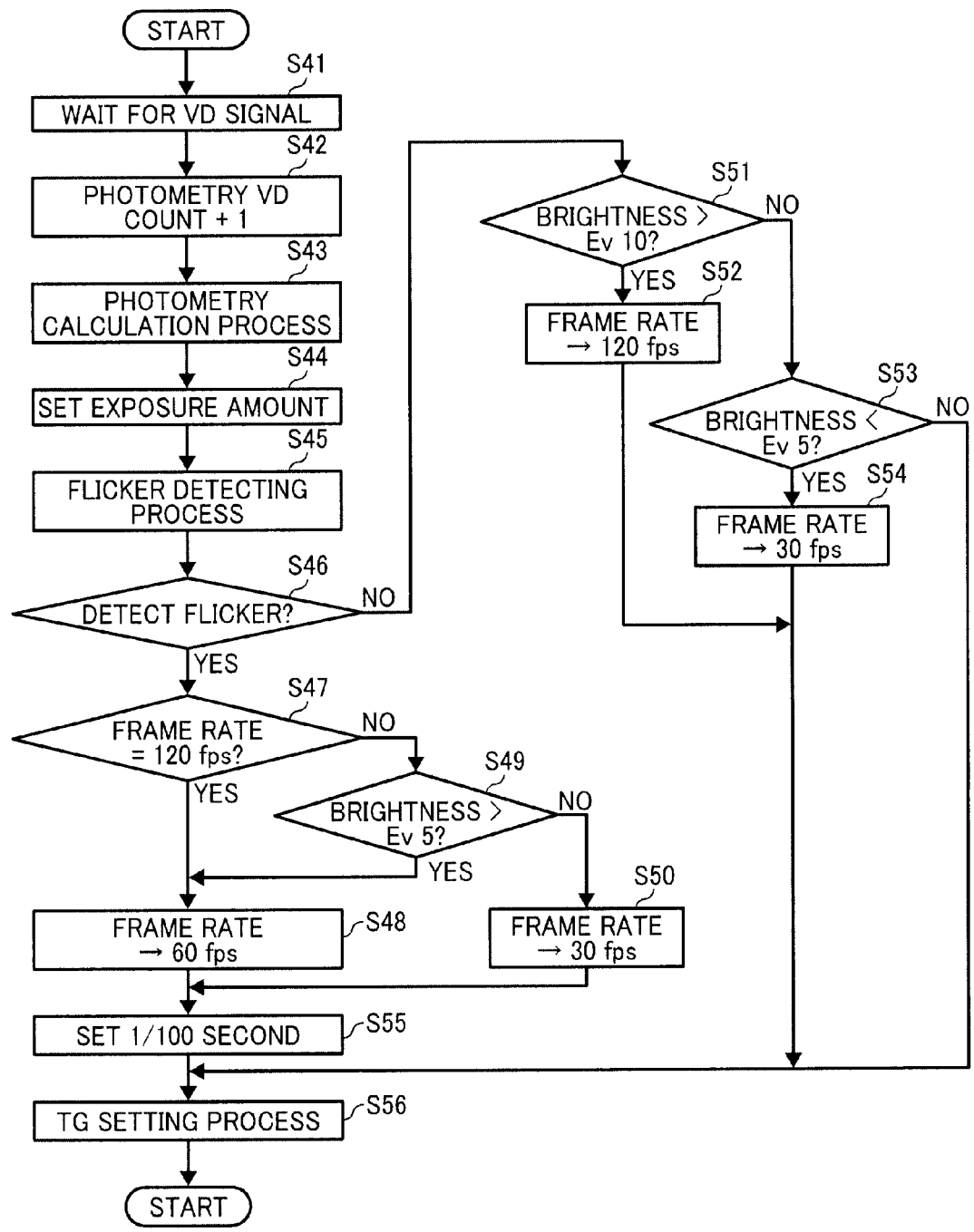
FIG. 15 is a flowchart illustrating a photometry process of the second embodiment, and details of the photometry process steps shown in FIG. 9.

After the photometry process shown in FIG. 15 is performed, the processor 105 performs the distance measurement process shown in FIG. 9. The steps of the distance measurement process are the same as in the first embodiment. Therefore, a detailed description will be skipped. By the second embodiment, flicker can be detected by use of the CCD 1013 as a photometry sensor, and a frame rate or an exposure time of the CCDs 1012 and 1011 as distance measurement sensors can be alternated, corresponding to whether flicker is detected. Thus, an exposure uniformity issue can be resolved during a distance measurement, the speed of measuring a distance can be improved to high-speed, and an accuracy of parallax calculation can be improved during a distance measurement.

The Third Embodiment

Figure 16:
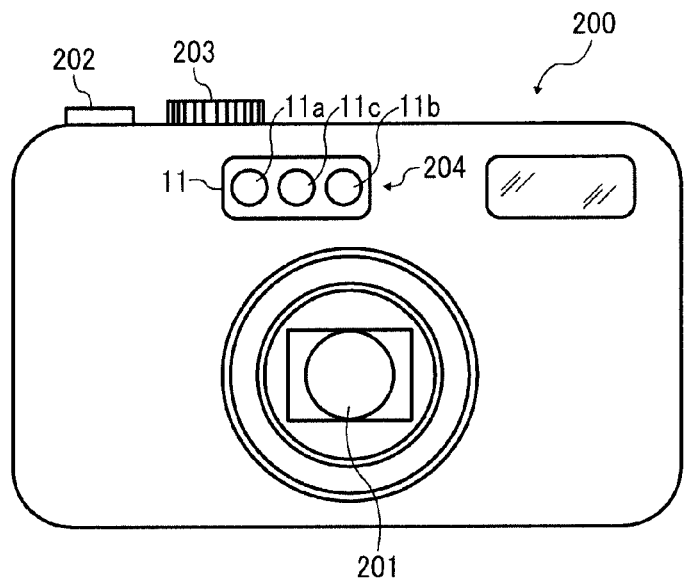
FIG. 16 illustrates a schematic diagram showing a digital camera, which is a sample of an imaging apparatus equipped with a distance measurement and photometry device.
Figure 17:
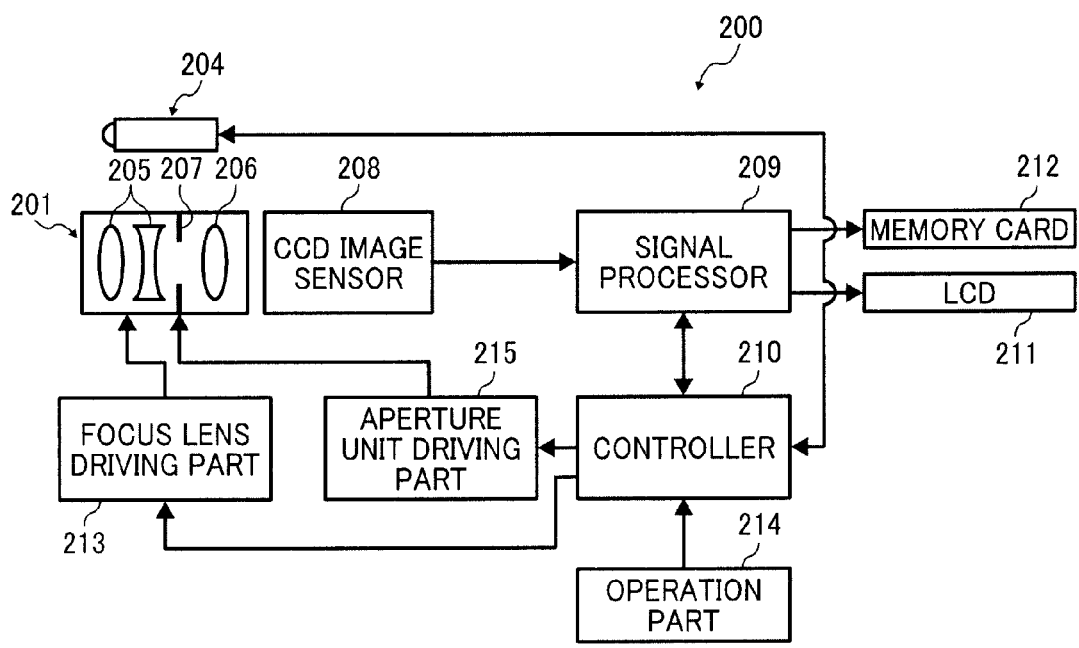
FIG. 17 illustrates a block diagram showing the hardware configuration of the digital camera shown in FIG. 16.

FIG. 16 illustrates a schematic diagram showing a digital camera, which is a sample of an imaging apparatus equipped with a distance measurement and photometry device of the first embodiment or the second embodiment. FIG. 17 illustrates a block diagram showing the hardware configuration of the digital camera shown in FIG. 16.

(Exterior Configuration of Digital Camera)

As shown in FIG. 16, the symbol "200" shows a digital camera, which is a sample of an imaging apparatus. The digital camera 200 includes an imaging lens system 201, a release button 202 as an operation part 214, and an imaging mode switching button 203. In addition, the digital camera 200 includes a distance measurement and photometry device 204, which is placed above the imaging lens system 201.

(System Configuration of Digital Camera)

As shown in FIG. 17, the imaging lens system 201 includes an imaging lens group 205, a focus lens group 206, an aperture unit 207 having a shutter function, and a CCD image sensor 208 being a solid-state image sensor. Also, an image of a subject coming through the imaging lens group 205 and the focus lens group 206 is formed on a light-receiving surface of the CCD 208.

An image signal of the CCD 208 is processed by an F/E-IC circuit (not shown), in the same way of the F/E-IC shown in FIG. 2, and input into a signal processor 209. The signal processor 209 converts the image signal into image data, which is available for display or storage. The signal processor 209 is controlled by a controller 210.

The controller 210 receives operation information from an operation part 214, and controls the digital camera 200 corresponding to the operation information from the operation part 214, based on a control program stored in a ROM (not shown), in the same way as the ROM 107 shown in FIG. 2.

The controller 210 controls a focus lens driving part 213, which drives the focus lens group 206, and an aperture unit driving part 215, which drives the aperture unit 207, based on the operation information from the operation part 214.

The distance measurement and photometry device 204 is connected to the controller 210, as shown in FIG. 2 and FIG. 17. If the release button 202 is pressed halfway, the distance measurement and photometry device 204 starts the photometry and distance measurement process based on control information of the controller 210, and the information of the photometry and distance measurement process are input into the controller 210 via the external I/F block 1054 shown in FIG. 2.

An exposure condition of a subject and a focusing distance of a subject, about the digital camera 200, are set based on the information of the photometry and distance measurement process, and an image is captured. The signal processor 209 is connected to a liquid crystal monitor (LCD) 211 and a memory card 212, and the LCD 211 displays image data produced by the signal processor 209. The memory card 212 is removable from the digital camera 200, and stores image data produced by the signal processor 209.

Furthermore, in the third embodiment, a circuit that includes the signal processor 209 and the controller 210 is configured to be different from a circuit that includes the processor 105, the SDRAM 106, and the ROM 107 shown in FIG. 2, in another circuit. However, the circuit that includes the signal processor 209 and the controller 210 can be integrally configured, with the circuit which includes the processor 105, the SDRAM 106, and the ROM 107 shown in FIG. 2.

Although the embodiments disclosed herein have been described above, they are not limited thereto.

It should be appreciated that variations may be made in the embodiments described by persons skilled in the art without departing from the scope of the embodiments described herein.

What is claimed is:

1. A distance measurement and photometry device, comprising:
    a pair of distance measurement sensors, each of which is a two-dimensional image sensor;
    a photometry sensor, which includes a two-dimensional image sensor;
    a pair of distance measurement lenses arranged to correspond to the pair of distance measurement sensors;
    a photometry lens arranged to correspond to the photometry sensor;
    a photometry process unit configured to calculate a brightness value of a subject, wherein the photometry process unit includes a flicker detecting process unit configured to detect flicker;
    an exposure state setting unit configured to set an exposure state corresponding to at least the pair of distance measurement sensors; and
    a distance measurement unit configured to measure a distance to the subject,
    wherein the exposure state setting unit is configured to change an exposure state of at least the pair of distance measurement sensors when the flicker detecting process unit determines that flicker is occurring.

2. The distance measurement and photometry device according to claim 1, wherein
the photometry sensor includes plural photometry sensors;
the photometry lens includes plural photometry lenses corresponding to the plural photometry sensors; and
the plural photometry lenses are arranged at different angles from each other.

3. The distance measurement and photometry device according to claim 1,
wherein the distance measurement unit is configured to calculate the distance to the subject by dividing the pair of distance measurement sensors into plural areas and comparing a shift length of parallax of each of the divided areas.

4. The distance measurement and photometry device according to claim 1,
wherein the exposure state setting unit is configured to set an exposure time to $\frac{1}{100}$ second.

5. The distance measurement and photometry device according to claim 1,
wherein the exposure state setting unit is configured to decrease a frame rate of the pair of distance measurement sensors, when the photometry process unit determines that the brightness value of the subject is not greater than a first predetermined value.

6. The distance measurement and photometry device according to claim 5,
wherein the exposure state setting unit is configured to increase a frame rate of the pair of distance measurement sensors, when the photometry process unit determines that the brightness value of the subject is greater than a second predetermined value, which is more than the first predetermined value.

7. The distance measurement and photometry device of claim 1, wherein the flicker detecting process unit is configured to detect flicker based on the calculated brightness value and previously calculated brightness values.

8. A distance measurement and photometry method implemented by a distance measurement and photometry device that includes a pair of distance measurement sensors, which includes a two-dimensional image sensor, a photometry sensor, which include a two-dimensional image sensor, a pair of lenses for distance measurement, which are arranged to correspond to the pair of sensors for distance measurement, and a photometry lens, which is arranged to correspond to the photometry sensor, the method comprising:
performing a photometry process based on a brightness value of a subject;
setting an exposure state of at least the pair of distance measurement sensors based on a result of the photometry process;
determining whether flicker is occurring;
changing the exposure state of the pair of distance measurement sensors when it is determined that flicker is occurring; and
measuring a distance to the subject based on the set exposure state.

9. An imaging apparatus, comprising:
an imaging unit configured to capture an image;
a pair of distance measurement sensors, each of which is a two-dimensional image sensor;
a photometry sensor, which includes a two-dimensional image sensor;
a pair of distance measurement lenses arranged to correspond to the pair of distance measurement sensors;
a photometry lens arranged to correspond to the photometry sensor;
a photometry process unit configured to calculate a brightness value of a subject, wherein the photometry process unit includes a flicker detecting process unit configured to detect flicker;
an exposure state setting unit configured to set an exposure state corresponding to at least the pair of distance measurement sensors; and
a distance measurement unit configured to measure a distance to the subject,
wherein the exposure state setting unit is configured to change an exposure state of at least the pair of distance measurement sensors when the flicker detecting process unit determines that flicker is occurring.

* * * * *